July 18, 1939.  E. W. AUSTIN  2,166,653

PROPELLER

Filed Feb. 10, 1936  3 Sheets-Sheet 1

INVENTOR.
Ellsworth W. Austin

July 18, 1939.　　　E. W. AUSTIN　　　2,166,653
PROPELLER
Filed Feb. 10, 1936　　　3 Sheets-Sheet 2

INVENTOR.
Ellsworth W. Austin

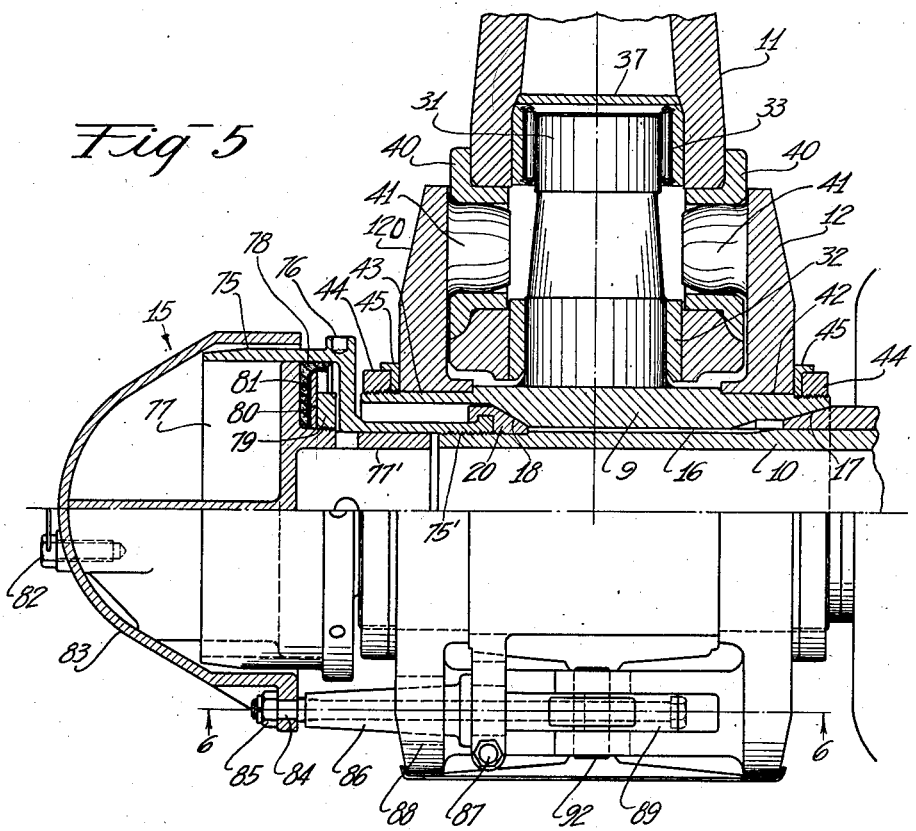

Patented July 18, 1939

2,166,653

UNITED STATES PATENT OFFICE 2,166,653

PROPELLER

Ellsworth W. Austin, Cedar Rapids, Iowa

Application February 10, 1936, Serial No. 63,053

8 Claims. (Cl. 170—163)

This invention relates to controllable pitch propellers and more particularly to aircraft propellers wherein power means is employed to adjust the pitch of the blades.

It is generally recognized that a slight alteration in the angle of incidence of the blades greatly increases the efficiency of a propeller, if the change may be made at the will of the operator during flight. There have been constructed various types of propellers known as controllable, however, in most instances elaborate systems of gear trains have necessarily been provided to operate the blades in unison to alter their pitch and to transmit the relatively low powers of a prime mover to effect this purpose.

The present invention has for an object a simplified method of connecting the blades to work in unison.

Another object of the invention is to provide power means for changing the pitch angle during flight.

Another object is to provide a simple reducing gear unit.

Another object is to provide a wedge means for transmitting power to rotate the blades.

Still another object of the present invention is to provide trunnion connections for the propeller blades.

Further objects of the invention are to provide a device simple in construction, durable, light in weight and one which lends itself readily to production methods of manufacture.

These and further objects and novel features of the present invention will be more fully evidenced from a study of the following description and accompanying drawings wherein like characters denote like parts throughout the several views:

Fig. 5 is a sectional view of a modification of my device.

Fig. 6 is a fragmental view taken along the line 6—6 of Fig. 5.

Fig. 7 is a fragmental view partly in section showing a modified arrangement for mounting a blade.

Figure 1:
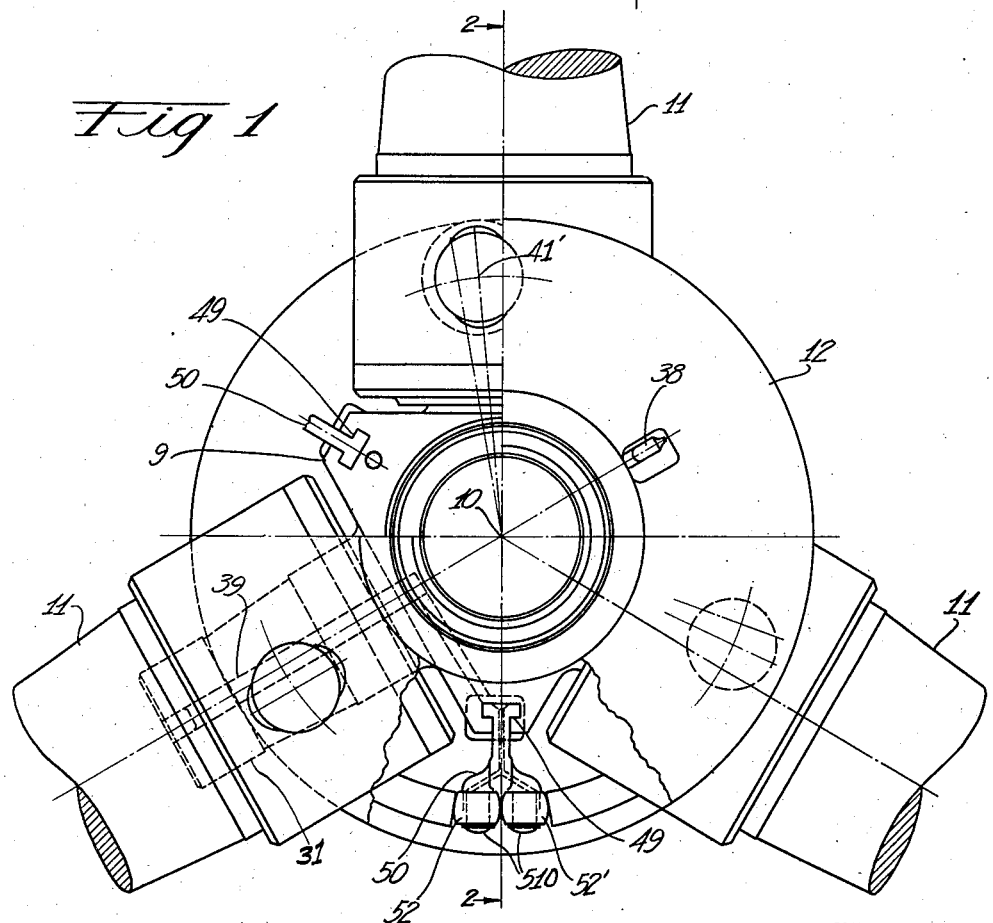
Fig. 1 is a rear view of a propeller embodying one form of the present invention, the blades being broken away.
Figure 2:
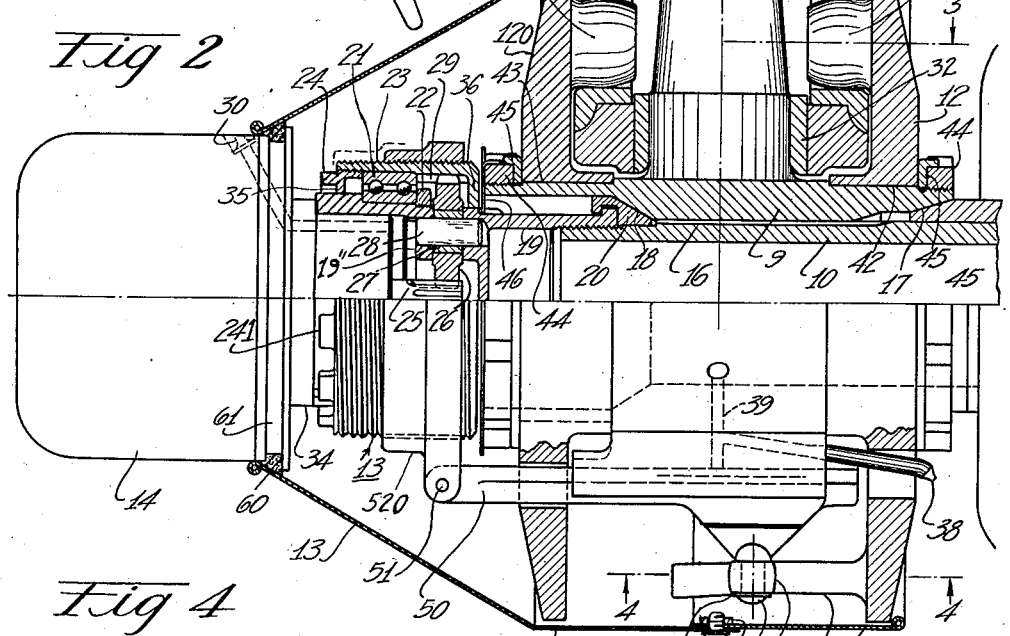
Fig. 2 is a side elevation principally in section taken along the irregular line 2—2 of Fig. 1.

Briefly referring to the drawings, Figs. 1, 2 and 5, a propeller hub 9 is mounted on the extension of an aircraft engine crankshaft 10. Propeller blades are designated as 11 and are simultaneously adjusted by annular members 12 and 120. In the preferred form an electrically driven reducing gear is generally indicated as 13 and a reversible motor 14 is axially mounted on the nose of the propeller and coupled to the reduction gear unit.

In the modification principally shown in Fig. 5 the reduction gear and motor are replaced with an hydraulic or fluid operated jack generally designated as 15. Fig. 6 shows clearly how a wedging means is arranged for rotating the annular members 12 and 120 in opposite directions when the fluid operated jack is employed. Thus it will be understood that my device is entirely workable.

Referring more in detail to the drawings, it will be noted that the hub 9 is arranged with splines 16 to engage mating splines on the engine shaft 10 and taper seats at 17 and 18 are provided in conventional manner for drawing the hub 9 snugly in place when nut member 19 of the preferred form is tightened up against the split cone washer 20. On the extended end of the nut member 19, ball bearing 21 is secured by the ring nut 22 and the externally threaded shell 23 is arranged to rotate having the outer race of the bearing clamped within its bore by the retainer 24 which is provided with spanner wrench projections 241 on its outer rim.

Provision is made for mounting the motor 14 in that the bore of nut member 19 is arranged to receive the cylindrical extension 34 of the motor 14. The armature shaft of the motor terminates in a pinion 25 in mesh with a pair of idler gears one of which is shown as 26. Conventional bushings 27 are pressed within the bore of the gears and pins 28 provide journals for the gears, inwardly projecting ear portions 19' of the nut member 19 being provided for the purpose. The threaded shell 23 is provided with internal gear teeth 29 for engaging the idler pinions 26. A lip 35 is provided inwardly extending from nut 24 and likewise a lip 36 fits closely about nut member 19 thus lubricant may be injected in the usual way at 30 and conducted through drillings that the gears and the bearings may be operated in a lubricant bath.

Referring again to hub 9 it will be observed that stub portions 31 provide journals for the shell blades 11. Bushings 32 are aranged at the base of the blades and roller bearings 33 are suitably spaced outwardly from the bushings to support the blades. 37 is a thin metal disc inserted in the bore of each shell blade to retain lubricant within the bearings. A grease fitting 38 being provided to serve through drillings 39 within each of the stubs 31.

Bushings 40 are pressed into the walls of the shell blades, diametrically opposite one another, to receive the barrel shaped trunnions 41 and 410 of the annular members 12 and 120 respectively.

Retaining nuts 44 are provided and washers 45 are arranged with prongs to engage and lock the nuts in conventional manner to allow the annular members to turn freely on the journalled ends 42 and 43 of the hub.

An additional lock 46 is provided to engage conventional notches in the nut member 19 and also to engage one or more of the usual spanner notches of the nut 44, that the nut member 19 may be securely held.

Figure 4:
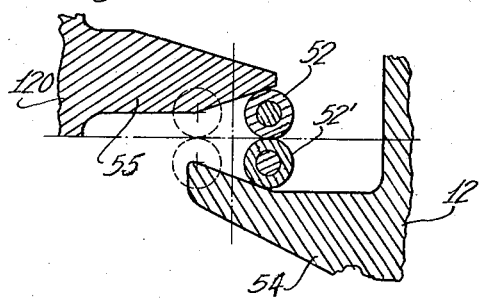
Fig. 4 is a fragmental view taken along the line 4—4 of Fig. 2.

Referring particularly to Fig. 1 it will be observed that between the blades there are T slots 49 cut the full length of the central portion of the hub 9, these slots being designed to carry sliding members 50, one of which is shown in Fig. 2. A plurality of pins is provided as 51 connecting each of the sliding members with the internally threaded sleeve 520 which is arranged to traverse the entire length of the threaded shell 23 previously described. Again referring to sliding members 50, stubs are provided at 510 with rollers 52 and 52' mounted thereon and retained with washers 53. The ends of stubs 51 being upset to form rivet heads to retain the washers. This arrangement is further shown in Fig. 1 wherein it will be observed that rollers 52 and 52' are arranged to contact one another for mutual support in resisting the thrust set up in spreading the wedge arms 54 and 55 which are integral parts of the annular members 12 and 120 respectively. Fig. 4 best illustrates the relative arrangement of the rollers 52 and 52' and the wedge arms 54 and 55.

To insure protection against the elements when the propeller is in service, sheet metal guards 56 and 57 are provided to entirely house the hub and associate mechanism. Screws 58 are employed to secure the guards firmly one to the other and are placed at intervals about their circumferential intersection. Reinforcing tapped washers 59 being spot welded to the guard 57 to receive the screws. An annular packing 60 is arranged in a groove 61 about the motor to insure a tight joint at this intersection.

The hydraulically operated modification shown in Fig. 5 has been briefly described and I will now refer in detail to the drawings, that a clear analysis of the mechanism may be had. To securely clamp the hub 9 in place on the engine shaft 10, the fixed cylinder 75 is threaded at 75' and adapted to receive the split cone washer 20. Conventional holes for a spanner wrench are provided at 76. It will be noted that piston 77 has a skirt portion 77' which slidably fits the smooth bore of the cylinder adjacent its threaded end and further a lip portion is provided to which is clamped the cup packing 78. Nut 79 is threaded to piston 77, and washer 80 in conjunction with a split lip expanding spring 81 assures the cup packing 78 being solidly clamped to the piston and expanded to seal against the cylinder wall in the desired manner.

Again referring to the piston 77, suitable provision is made by extended ribs and arranging cap-screws 82 for mounting a spinner 83 which has its open end telescoping the cylinder and providing lugs to which are clamped the connecting rods 84 by the nuts 85.

To assure alignment of the connecting rods 84 one of which is shown in Fig. 5, guides 86 are arranged to be clamped in place by bolts 87 in the extended ear portions of the hub. The annular member 120 is provided with suitable holes 88 to allow clearance for the guides for, as will be observed in Fig. 6, both annular members 12 and 120 are arranged to be slightly rotated about the hub as an axis, as in the case of my preferred form previously described, when wedges 89 are made to compress springs 90 which are arranged on the shanks of the connecting rods. It will be understood that a plurality of wedge arrangements is usually provided, the number of course depending on whether the propeller be a two or three bladed one.

Rollers 91 are arranged to turn in the ear portions of each of the annular members, pins 92 being provided for the purpose.

Figure 8:
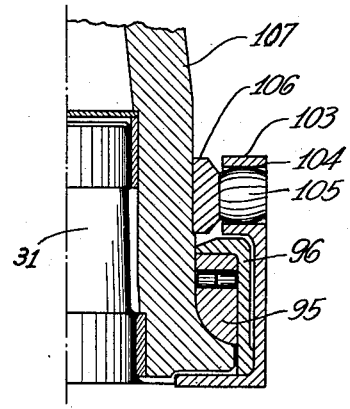
Fig. 8 is a fragmental view partly in section showing still another modification for mounting a blade.

Referring to Figs. 7 and 8 further modifications of my propeller will be noted, wherein thrust bearings 95 of conventional form are employed for the blades. Likewise an incasement consisting of halves 96 and 97 is arranged to contain the thrust bearings. In Fig. 7 annular members 98 and 99 are of the type described for the preferred form and likewise the type applied to my device as illustrated for hydraulic operation. It will be noted that trunnions 100 and 101 are necessarily offset inwardly toward the blades 108 to be received within the suitable openings 109 of band 102.

Fig. 8 illustrates another method of applying trunnions to turn the blades when thrust bearings are also used. In this instance the annular members 103 have openings 104 arranged to receive the extending trunnions 105, one of which is shown, of band 106 which is solidly clamped to the blade 107. It will be noted that the arrangement just described is simply a reversal of certain parts of the arrangement of Fig. 7 and will be further noted that such an arrangement might logically be applied to the forms of my device previously described and should properly be considered well within the scope of the appended claims.

Figure 3:
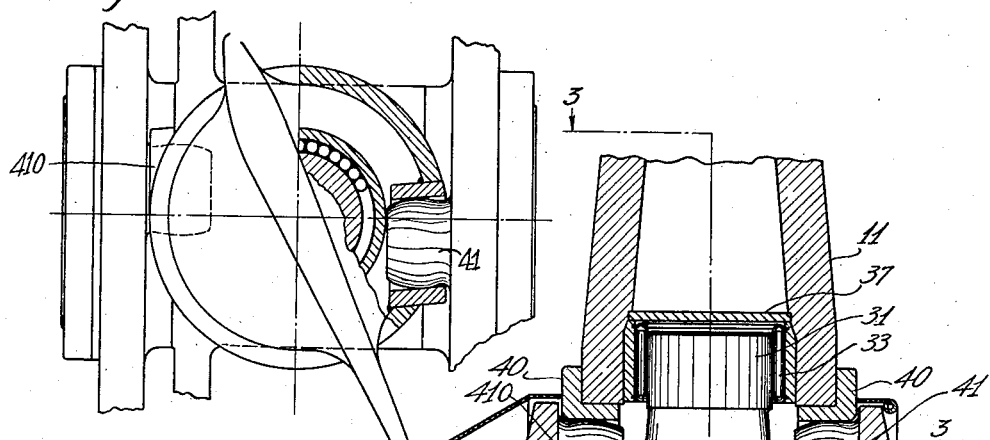
Fig. 3 is a sectional view taken along the line 3—3 of Fig. 2.

The operation of the device in general is as follows: Propellers of the type in question may either be provided with special means such as counterweights to prevail over forces tending to turn the blades, or in certain cases the distribution of material in the blades themselves may act in a sufficient degree that the blades inherently seek a high pitch position as illustrated by the drawing of the blade shown in Fig. 3. Also I have shown another method of causing the propeller blades to seek a high pitch position. This is clearly illustrated in Figs. 1, 3, and 4 and principally consists of offsetting the trunnions 41 and 410 from the radial centerline of their blade, to a point such as 41. This arrangement has a function similar to that of an arrangement shown in my co-pending application, Serial Number 30,301 filed July 8, 1935, namely to apply the centrifugal force of the blades in action at a point other than on the true radial centerline thus to set up moments to rotate the annular members and blades.

It will be seen that with a construction embodying means normally to advance the pitch of the blades, two principal advantages are had.

First, power to operate the blades to adjust the pitch, need be applied in only one direction, namely to decrease the pitch. Secondly, lost motion in controlling the blade is entirely eliminated as will be readily understood.

Resistance to the inherent turning of the propeller blades and likewise a reversal of the turning, the latter to reduce the pitch angle, is obtained in the preferred form by action of rollers 52 and 52' on the wedge arms 54 and 55. These in turn are driven forward or back at the will of the operator, for at his station a reversing switch, not shown, connects the motor 14 to a source of current also not shown, such as a generator driven from the aircraft engine or a storage battery.

In service the operator may cause the electric motor to operate in the so-called reverse direction, this will set in motion the gears 26 of the reduction unit 13, thus cause a rotation of the externally threaded shell 23 which in turn will force the sleeve 520 in the direction of the dotted line toward the motor housing. This of course causes the sliding members 50 on which the rollers are mouted to also be moved forward or toward the motor. The rollers 52 and 52' taking the position as indicated by the dotted lines to spread the wedge arms. The propeller blades thus being adjusted to a low pitch, the aircraft may take off.

When full flight is reached and the pitch angle of the blades is desired to be increased, the motor is again set in operation but in the opposite direction from that previously used and, of course, in like manner the rollers are moved to allow the annular members 12 and 120 to resume their original position and thus the blades again take a high pitch. Intermediate positions of the blades obviously are obtained at the will of the operator. It can be perceived that in some cases inherent turning of the blades may be toward the low pitch setting, in which case the arrangement of wedge arms and rollers may, of course, be such as to function accordingly. A spreading of the arms by the action of the power means, in such cases, causing an increase of pitch angle.

The operation of the modified form shown in Figs. 5 and 6 utilizing an hydraulic or fluid operated jack 15 to move the wedge member 89 is analogous to that described for the electrically operated device. In this case a control valve not shown, is provided for the operator that fluid may enter the cylinder 75 under pressure from a pump, not shown, through the central bore of the engine shaft 10. The expansion of the jack will in this case move the wedge members 89 that the annular members result in a blade action of decreased pitch. The springs in addition to the inherent ability of the blades to seek a high pitch, suffice a means for returning the piston 77 of jack 15 to its original position when the operator's valve is opened to discharge the fluid to a reservoir or storage tank not shown.

Variations of the device may be resorted to within the scope of the invention and members shown may be omitted or others added yet holding to the spirit of the description and claims.

I claim as my invention:

1. An aircraft propeller comprising a hub and blades arranged for pitch adjustment, annular members mounted on the hub with the blades interposed therebetween, connections for the blades that simultaneous adjusting action may be obtained, wedge arm extensions of said annular members, said extensions being positioned in opposition one to another for wedging action, and a means for rotating the annular members in opposite direction comprising a pair of rollers mounted on the hub to coact with the wedge arm extensions to cause angular movement thereof and a power means mounted on the hub and connections from the power means to move the rollers axially with respect to the hub.

2. A controllable pitch propeller having a hub with stubs and adjustable blades mounted thereon, power means positioned axially with respect to the hub, an annular member arranged to rotate on the hub in response to turning of the blades, and a wedge means, non-rotatable with respect to its own axis but arranged eccentrically outside the hub for axial movement on the hub and connections for the power means to operate the wedge means to oppose the rotation of the annular member.

3. An aircraft propeller comprising a hub and blades arranged for pitch adjustment, an annular member mounted on the hub and having connections to the blades for simultaneous movement thereof, and a wedging means comprising a roller for wedge action, a wedge arm extension formed as a side projection of said annular member and having an angular surface thereon, said roller being arranged to contact said angular surface; a sliding member disposed on one side of said hub and mounting said roller for axial sliding movement so that said annular member is rotated upon axial movement of said sliding member, power means connected to said sliding member to cause axial movement of said sliding member in either direction.

4. An aircraft propeller comprising a hub, a slot disposed on the surface of the hub, and a plurality of blades mounted on the hub for pitch adjustment, an annular member mounted to rotate on the hub, a wedge arm projection extending from the face of the annular member, connections from the annular member to the blades to effect simultaneous adjustment of the same, and a sliding member arranged in the slot of the hub, a roller so mounted on the sliding member that power applied to move the latter axially causes the roller to contact the wedge arm projection of the annular member to rotate the same.

5. An aircraft propeller comprising a hub, slots arranged axially thereof, a plurality of blades mounted on the hub for pitch adjustment, an annular member mounted to rotate on the hub, connections from the annular member to the blades to effect simultaneous adjustment of the same, projections on the inner face of the annular member, a plurality of sliding members arranged in the slots, rollers mounted on the sliding members for contacting the projections of the annular member for rotation of the same, an internally threaded sleeve disposed concentrically with respect to the hub, connections from each sliding member to the sleeve to transmit axial adjusting movement therefrom, a threaded member arranged concentrically with the sleeve to coact therewith and power means for operating said sleeve through the coaction of said threaded member.

6. An aircraft propeller comprising a hub with slots arranged axially thereof and a plurality of blades mounted for pitch adjustment, an annular member mounted to rotate on the hub, connections from the annular member to the blades to effect simultaneous adjustment of the same, projections on a face of the annular member, a plurality of sliding members arranged in the slots, rollers mounted on the sliding members for contacting the projections of the annular member for rotation of the same and a power operated actuating device comprising internally and externally threaded members for effecting simultaneous axial movement of the sliding members.

7. A propeller comprising a hub with blades mounted thereon for pitch variation, annular members arranged to rotate about the axis of the hub to simultaneously adjust the pitch of the blades, wedge arm extensions, one each being provided for said annular members and arranged for wedge action, a sliding member arranged to slide axially on an outer portion of the hub, and a wedge member mounted on the sliding member and positioned between said wedge arm extensions to coact with and to adjust the same, a power means for operating the sliding member, and connection means coupling the power means to the sliding member to actuate the same.

8. A propeller comprising a hub with blades mounted thereon for pitch variation, blade adjusting means arranged to rotate on said hub for simultaneously adjusting the pitch of the blades, wedge arm extensions integrally arranged with said blade adjusting means whereby the displacement of one of said wedge arm extensions will cause rotary movement of said adjusting means, the wedge arm extensions being arranged in proximity one with another for wedge action, a sliding member arranged to slide axially with respect to the hub, a wedge member mounted on the sliding member and positioned between said wedge arm extensions to coact with and to adjust the same, a power means for operating the sliding member, and connection means coupling the power means to the sliding member to actuate the same.

ELLSWORTH W. AUSTIN.